(12) United States Patent
Ireland

(10) Patent No.: US 8,841,372 B2
(45) Date of Patent: Sep. 23, 2014

(54) METHOD AND COMPOSITIONS FOR THE SEALING AND ASSEMBLY OF POWER TRAIN COMPONENTS

(75) Inventor: Tania Ireland, Lyons (FR)

(73) Assignee: Bluestar Silicones France SAS, Lyons (FR)

( * ) Notice: Subject to any disclaimer, the term of this patent is extended or adjusted under 35 U.S.C. 154(b) by 0 days.

(21) Appl. No.: 13/635,338

(22) PCT Filed: Mar. 15, 2011

(86) PCT No.: PCT/FR2011/000142
§ 371 (c)(1),
(2), (4) Date: Dec. 26, 2012

(87) PCT Pub. No.: WO2011/114021
PCT Pub. Date: Sep. 22, 2011

(65) Prior Publication Data
US 2013/0102720 A1    Apr. 25, 2013

(30) Foreign Application Priority Data
Mar. 16, 2010  (FR) ...................................... 10 01053

(51) Int. Cl.
| | | |
|---|---|---|
| *C08L 83/04* | (2006.01) | |
| *C09J 183/04* | (2006.01) | |
| *F16J 15/10* | (2006.01) | |
| *C08G 77/18* | (2006.01) | |
| *C08G 77/04* | (2006.01) | |
| *C08K 3/04* | (2006.01) | |
| *C08K 5/5419* | (2006.01) | |

(52) U.S. Cl.
CPC ................ *C08L 83/04* (2013.01); *C08G 77/18* (2013.01); *C08G 77/045* (2013.01); *C09J 183/04* (2013.01); *C08K 3/04* (2013.01); *F16J 15/102* (2013.01); *C08K 5/5419* (2013.01)
USPC .......................................... 524/400; 524/588

(58) Field of Classification Search
CPC ............. C08L 83/04; H01B 1/04; H01B 1/24
See application file for complete search history.

(56) References Cited

U.S. PATENT DOCUMENTS

| | | | | |
|---|---|---|---|---|
| 4,221,693 | A  * | 9/1980  | Getson et al. ................. | 523/212 |
| 4,489,199 | A  * | 12/1984 | Wengrovius .................... | 528/16 |
| 4,777,205 | A  * | 10/1988 | La Scola et al. .............. | 524/440 |
| 4,973,644 | A  * | 11/1990 | Onishi et al. .................... | 528/15 |
| 5,013,781 | A  * | 5/1991  | Koshii et al. .................. | 524/864 |
| 5,015,413 | A  * | 5/1991  | Nagaoka ....................... | 252/511 |
| 5,082,596 | A  * | 1/1992  | Fukuda et al. ................ | 252/511 |
| 5,183,873 | A  * | 2/1993  | Viksne ........................... | 528/16 |
| 5,247,011 | A    | 9/1993  | Tsuji et al. | |
| 5,641,832 | A    | 6/1997  | Nagaoka | |
| 6,114,438 | A  * | 9/2000  | Lower ........................... | 524/788 |
| 6,413,354 | B1 * | 7/2002  | Haas et al. .................... | 156/329 |
| 7,205,050 | B2 * | 4/2007  | Haas ............................. | 428/447 |
| 7,452,605 | B2 * | 11/2008 | Akamatsu et al. ............. | 428/428 |
| 8,153,724 | B2 * | 4/2012  | Maton et al. .................. | 524/588 |
| 2007/0149834 | A1* | 6/2007 | Endo et al. ........................ | 585/7 |
| 2007/0293624 | A1* | 12/2007 | Matsumoto et al. .......... | 524/588 |

FOREIGN PATENT DOCUMENTS

| | | | | |
|---|---|---|---|---|
| EP | 1985666 A1 | 10/2008 | | |
| JP | 2006117777 A  * | 5/2006 | ............. | C08L 83/06 |
| JP | 2009197188 A | 9/2009 | | |

OTHER PUBLICATIONS

Machine-generated English-language translation of JP-2006117777, 8 pages, translation generated Sep. 2013.*
International Search Report for PCT/FR2011/000142 Mailed Jun. 15, 2011.

* cited by examiner

*Primary Examiner* — Robert S Loewe
(74) *Attorney, Agent, or Firm* — Miles & Stockbridge P.C.

(57) ABSTRACT

The present invention relates to a silicone composition crosslinkable into elastomer, and to a method which uses the composition of the invention to form joints for sealing and assembling the components of a power train. The silicone elastomers prepared from the composition according to the invention have the following properties: good resistance to aging in chemically aggressive fluids, such as those used for example in a power train, in this case motor oils, gearbox and axle lubricants, oil/gasoline mixtures, coolants, and fuels or antifreeze liquids; good adhesive properties including on surfaces soiled with oils used in power trains; and good mechanical strength properties, such as tensile strength, modulus at 100% elongation, and Shore hardness.

15 Claims, No Drawings

METHOD AND COMPOSITIONS FOR THE SEALING AND ASSEMBLY OF POWER TRAIN COMPONENTS

CROSS REFERENCE TO RELATED APPLICATIONS

This application is a §371 National Stage Application of PCT/FR2011/000142, filed Mar. 15, 2011, which claims priority to French Application No. 1001053, filed Mar. 16, 2010.

BACKGROUND OF THE INVENTION

1. Field of the Invention

The subject matter of the present invention is a silicone composition which can be crosslinked to give an elastomer and a process using the composition according to the invention in order to form seals for sealing and assembling the components of a power train. The silicone elastomers prepared from the composition according to the invention exhibit:

- good resistance to ageing in chemically aggressive fluids, such as those used, for example, in a power train, in the case in point engine oils, gearbox and axle lubricants, oil/gasoline mixtures, coolants, fuel oils or antifreeze liquids,
- good adhesive properties, even on surfaces contaminated by oils used in a power train, and
- good mechanical strength properties, such as ultimate strength, modulus at 100% elongation and Shore hardness.

2. Description of Related Art

The term "coolant" is understood to mean any heat-exchange liquid used to remove heat from a mechanical or electronic system.

Silicone compositions which can be crosslinked to give an elastomer in order to form gaskets are known. Specifically, they are suitable in particular for the formation of gaskets "in situ", which are formed directly during the assembly of the constituents, in particular in the motor vehicle field.

Among the silicone compositions which can be crosslinked to give an elastomer known for this type of application, those which crosslink from ambient temperature form a category which attracts all the attention as they do not require the installation of an energy-consuming oven.

These silicone compositions are categorized into two distinct groups: one-component compositions (RTV-1) and two-component compositions (RTV-2). The term "RTV" is an acronym for "Room Temperature Vulcanizing".

During the crosslinking, water (either introduced by atmospheric moisture, in the case of RTV-1 compositions, or introduced into a portion of the composition, in the case of RTV-2 compositions) makes possible the polycondensation reaction, which results in the formation of the elastomer network.

Generally, the one-component compositions (RTV-1) crosslink when they are exposed to atmospheric moisture. Generally, the kinetics of the polycondensation reactions are extremely slow; these reactions are thus catalyzed by an appropriate catalyst.

Furthermore, faced with a transportation industry which is changing fast, new constraints are emerging related to the increase in energy efficiencies, to the increase in operating temperatures, to the decrease in fuel consumption and to the decrease in the frequency of maintenance.

Thus, formulators of power train fluids (engine oil, gearbox and axle lubricant, oil/gasoline mixture, coolant, fuel oil or antifreeze liquid) continue to improve the performances of these products by the addition of ever more efficient additives. The amount of additives incorporated in these products increases ever more, which has the effect of increasing their chemical aggressiveness with regard to flexible members, for example gaskets, present in the devices in which these products are used.

Patent application JP-A-2009197188 describes silicone compositions having a good resistance to contact with the various fluids used in a power train but these compositions comprise complex and expensive crosslinkable oils which comprise a $C_1$ to $C_5$ alkylene linking unit represented by the symbol Y in the following formulae:

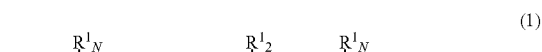

(1)

(3)

There thus exists a growing need to find novel silicone compositions of use in forming seals for sealing and assembling the components of a power train, even on surfaces contaminated by oils.

SUMMARY

Thus, one of the essential objectives of the present invention is to provide novel organopolysiloxane compositions which cure to give a silicone elastomer in the presence of water or moisture of use in the sealing and assembling of the constituents of a power train.

Another objective is to provide a novel process for sealing and assembling components of a power train by means of silicone seals having good resistance on contact with the various fluids used in a power train while having good adhesive properties.

These objectives, among others, are achieved by the present invention, which relates to a polyorganosiloxane composition X which can be crosslinked to give an elastomer in the presence of water by polycondensation reactions, comprising:

A) at least one polyorganosiloxane A comprising at least one alkoxylated group and composed of identical or different siloxyl units, of formula:

(1)

in which:
the symbol $Z=[-(OCH_2CH_2)_c-OR^5]$, with $c=0$ or 1,
$a=0, 1, 2$ or 3; $b=0, 1, 2$ or 3, $a+b=0, 1, 2$ or 3,
the symbol $R^4$ represents a monovalent $C_1$ to $C_{13}$ hydrocarbon radical,
the symbol $R^5$ represents a monovalent $C_1$ to $C_6$ hydrocarbon radical or an alkoxyalkyl radical optionally comprising an ester functional group, and
with the condition that, for at least one siloxyl unit, the index $b \geq 1$, so that the polyorganosiloxane A comprises at least one alkoxylated group Z, B) at least one siloxane D which is a condensate obtained by partial hydrolysis and condensation of a polyalkoxylated silane, said siloxane D having from 2 to 10 identical or different siloxyl units, of formula:

(2)

in which:
x'=0, 1, 2 or 3; y'=0, 1, 2 or 3; x'+y'=0, 1, 2 or 3,
the symbol $R^2$ represents a monovalent $C_1$ to $C_{13}$ hydrocarbon radical,
the symbol $R^3$ represents a monovalent $C_1$ to $C_6$ hydrocarbon radical or an alkoxyalkyl radical optionally comprising an ester functional group, and
with the condition that, for at least one siloxyl unit, the index y'≥1,
C) an additive E capable of absorbing an oil used in a power train, such as acetylene black,
D) a catalytically effective amount of at least one condensation catalyst F,
E) optionally at least one filler G,
F) optionally at least one adhesion promoter H, and
G) optionally at least one additive I, such as a coloring base, a pigment or a thixotropic agent.

DETAILED DESCRIPTION OF A PREFERRED EMBODIMENT

In order to achieve this objective, the applicant company has had the credit of demonstrating, entirely surprisingly and unexpectedly, that the use of a siloxane D, which is a condensate obtained by partial hydrolysis and condensation of a polyalkoxylated silane, in combination with an additive E capable of absorbing an oil used in a power train, such as acetylene black, makes it possible to prepare seals which ensure the sealing and assembly of components or constituents used in a power train, this being the case even with alkoxylated polyorganosiloxanes not exhibiting an alkylene linking unit as described in patent application JP-A-2009197188.

Furthermore, the silicone elastomers prepared from the composition according to the invention exhibit the advantage of maintaining good mechanical properties, even when they are in prolonged contact with chemically aggressive fluids, such as those used, for example, in a power train.

Mention may be made, as examples of chemically aggressive fluids, for example, of: engine oils, gearbox and axle lubricants, oil/gasoline mixtures, coolants, fuel oils and antifreeze liquids.

Preferably, the crosslinkable polyorganosiloxane A is linear and has the expanded formula:

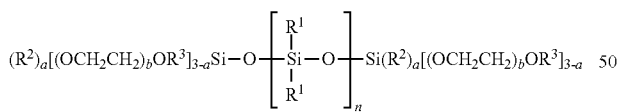

(3)

in which:
the substituents $R^1$, which are identical or different, each represent a saturated or unsaturated monovalent $C_1$ to $C_{13}$ hydrocarbon radical which is substituted or unsubstituted and aliphatic, cyclanic or aromatic;
the substituents $R^2$, which are identical or different, each represent a saturated or unsaturated monovalent $C_1$ to $C_{13}$ hydrocarbon radical which is substituted or unsubstituted and aliphatic, cyclanic or aromatic;
the substituents $R^3$, which are identical or different, each represent a linear or branched $C_1$ to $C_6$ alkyl radical;
n has a value sufficient to confer, on the polyorganopolysiloxane of formula A, a dynamic viscosity at 25° C. ranging from 1000 to 1000000 mPa·s; and
the index a is equal to 0 or 1 and the index b is equal to 0 or 1.

According to another preferred embodiment, the polyorganosiloxane A comprising at least one alkoxylated group is obtained by reacting, optionally in situ, in the presence of a catalytically effective amount of at least one functionalization catalyst C:

a) at least one polyorganosiloxane A' comprising siloxyl units of formula:

(4)

in which:
x+y=0, 1, 2 or 3;
the substituents which are identical or different, each represent a monovalent $C_1$ to $C_{30}$ hydrocarbon radical chosen from the group consisting of alkyl, cycloalkyl, aryl, alkaryl and aralkyl radicals, and
at least two siloxyl units comprising an ≡SiOH group are present in the polyorganosiloxane A', with b) at least one polyalkoxylated silane B of formula:

(5)

in which:
z=0 or 1,
the symbol $R^2$ represents a monovalent $C_1$ to $C_{13}$ hydrocarbon radical, and
the symbols $R^3$, which are identical or different, each represent a monovalent $C_1$ to $C_6$ hydrocarbon radical or an alkoxyalkyl radical optionally exhibiting an ester functional group.

The preparation of polyorganosiloxane comprising alkoxylated groups by functionalization is described, for example, in French patent application No. FR 2 638752-A1.

According to another preferred embodiment, the polyorganosiloxane A' is preferably an α,ω-dihydroxypolydiorganosiloxane polymer, with a viscosity of between 50 and 5000000 mPa·s at 25° C.

The polyalkoxylated silanes B are products accessible on the silicones market; in addition, their use in the compositions which cure from ambient temperature is known; they appear in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Mention may be made, as examples of polyalkoxylated silanes B, of those of formula:

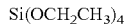

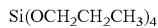

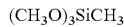

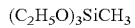

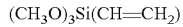

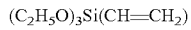

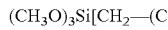

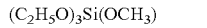

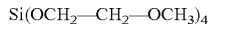

(CH$_2$=CH)Si(OCH$_2$CH$_2$OCH$_3$)$_3$

C$_6$H$_5$Si(OCH$_3$)$_3$

C$_6$H$_5$Si(OCH$_2$—CH$_2$—OCH$_3$)$_3$

The introduction of a filler G has the aim of conferring good mechanical and rheological characteristics on the elastomers resulting from the curing of the compositions in accordance with the invention.

Use is made, for example, of very finely divided inorganic fillers, the mean particle diameter of which is less than 0.1 μm. These fillers include fumed silicas and precipitated silicas; their BET specific surface is generally greater than 40 m$^2$/g. These fillers can also be provided in the form of more coarsely divided products, with a mean particle diameter of greater than 0.1 μm. Mention may be made, as examples of such fillers, of ground quartz, diatomaceous silicas, calcium carbonate, optionally treated at the surface with an organic acid or with an ester of an organic acid, calcined clay, titanium oxide of the rutile type, iron, zinc, chromium, zirconium or magnesium oxides, the various forms of alumina (hydrated or nonhydrated), boron nitride, lithopone, barium metaborate, barium sulfate or glass microbeads; their specific surface is generally less than 30 m$^2$/g.

These fillers may have been modified at the surface by treatment with the various organosilicon compounds commonly employed for this use. Thus, these organosilicon compounds can be organochlorosilanes, diorganocyclopolysiloxanes, hexaorganodisiloxanes, hexaorganodisilazanes or diorganocyclopolysilazanes (French patents FR-A-1 126 884, FR-A-1 136 885, FR-A-1 236 505 and British patent GB-A-1 024 234). The treated fillers include, in the majority of cases, from 3 to 30% of their weight of organosilicon compounds. The fillers can be composed of a mixture of several types of fillers of different particle size; thus, for example, they can be composed of from 30 to 70% of finely divided silicas with a BET specific surface of greater than 40 m$^2$/g and of 70 to 30% of more coarsely divided silicas with a specific surface of less than 30 m$^2$/g. These fillers may have been surface treated.

Preferably, the filler G is present and is preferably a calcium carbonate treated at the surface with a stearic acid.

The composition according to the invention can comprise at least one adhesion promoter H, such as, for example:
vinyltrimethoxysilane (VMTO),
3-glycidoxypropyltrimethoxysilane (GLYMO)
methacryloyloxypropyltrimethoxysilane (MEMO)

[H$_2$N(CH$_2$)$_3$]Si(OCH$_2$CH$_2$CH$_3$)$_3$

[H$_2$N(CH$_2$)$_3$]Si(OCH$_3$)$_3$

[H$_2$N(CH$_2$)$_3$]Si(OC$_2$H$_5$)$_3$

[H$_2$N(CH$_2$)$_3$]Si(OCH$_3$)$_3$

[H$_2$NCH$_2$CH(CH$_3$)CH$_2$CH$_2$]SiCH$_3$(OCH$_3$)$_2$

[H$_2$NCH$_2$]Si(OCH$_3$)$_3$

[n-C$_3$H$_3$—HN—CH$_2$]Si(OCH$_3$)$_3$

[H$_2$N(CH$_2$)$_2$NH(CH$_2$)$_3$]Si(OCH$_3$)$_3$

[H$_2$N(CH$_2$)$_2$NH(CH$_2$)$_3$]Si(OCH2CH$_2$OCH$_3$)$_3$

[CH$_3$NH(CH$_2$)$_2$NH(CH$_2$)$_3$]Si(OCH$_3$)$_3$

[H(NHCH$_2$CH$_2$)$_3$NH(CH$_2$)$_3$]Si(OCH$_3$)$_3$

HS(CH$_2$)$_3$Si(OCH$_3$)$_3$

NH2CONH2(CH$_2$)$_3$Si(OCH$_3$)$_3$

H$_2$(CH$_2$)NH(CH$_2$)$_3$Si(OCH$_3$)$_2$
                              OCH(CH$_2$)CHOCH$_3$
H$_2$(CH$_2$)NH(CH$_2$)$_3$Si—CH=CH$_2$
                            (OCH$_3$)$_2$ or polyorganosiloxane oligomers comprising such organic groups at a content of greater than 20%.

Preferably, the functionalization catalyst C is lithium hydroxide or potassium hydroxide.

Lithium hydroxide is widely available commercially. It is preferably used in solution in an alcohol, such as, for example, methanol or ethanol.

According to a preferred embodiment, the condensation catalyst F is a tin, zinc or titanium derivative or a optionally silylated guanidine.

Use may be made, as tin-derived condensation catalyst, of tin monocarboxylates and dicarboxylates, such as tin 2-ethylhexanoate, dibutyltin dilaurate or dibutyltin diacetate (see the work by Noll, "Chemistry and Technology of Silicone", page 337, Academic Press, 1968, 2nd edition, or the patents EP 147 323 or EP 235 049).

According to a preferred embodiment, the condensation catalyst F is a guanidine corresponding to the general formula (I):

in which:
the R$^1$ radicals, which are identical or different, represent, independently of one another, a linear or branched monovalent alkyl group, a cycloalkyl group, a (cycloalkyl)alkyl group, the ring being substituted or unsubstituted and being able to comprise at least one heteroatom, or a fluoroalkyl group, the R$^2$ radical represents a hydrogen atom, a linear or branched monovalent alkyl group, a cycloalkyl group, an alkyl group substituted by a ring, which is substituted or unsubstituted and which can comprise at least one heteroatom, an aromatic group, an arylalkyl group, a fluoroalkyl group, an alkylamine group or an alkylguanidine group, and the R$^3$ radical represents a linear or branched monovalent alkyl group, a cycloalkyl group, an alkyl group substituted by a ring, which is substituted or unsubstituted and which can comprise at least one heteroatom, or an arylalkyl, fluoroalkyl, alkylamine or alkylguanidine group, when the R$^2$ radical is not a hydrogen atom, the R$^2$ and R$^3$ radicals can be linked up to form a 3-, 4-, 5-, 6- or 7-membered aliphatic ring optionally substituted by one or more substituents.

They are 1,2,3-trisubstituted and 1,2,3,3-tetrasubstituted guanidines and they exhibit the advantage of being liquid, colorless, odorless and soluble in silicone matrices. Examples of catalysts of this type are described in the international patent application WO2009/118307.

Use will preferably be made of the following catalysts (A1) to (A6):

(A1)
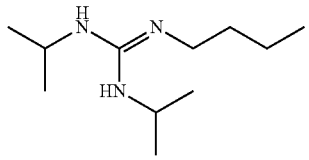

(A2)
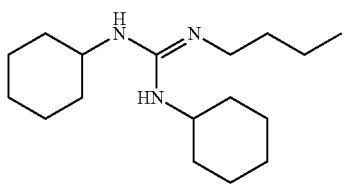

(A3)
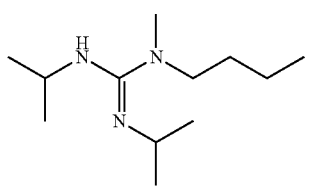

(A4)
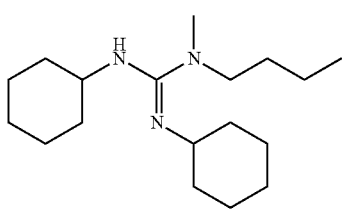

(A5)
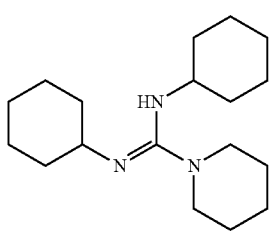

(A6)
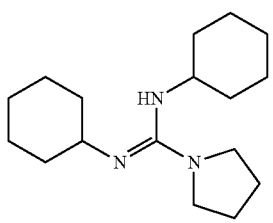

According to another preferred embodiment, the condensation catalyst F is a guanidine of formula:

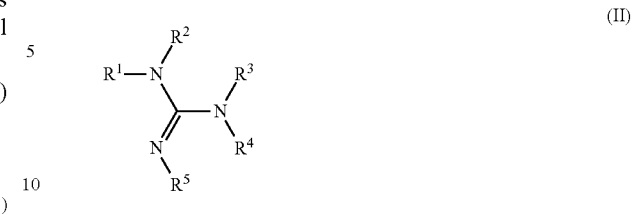

(II)

in which:
the $R^1$, $R^2$, $R^3$, $R^4$ or $R^5$ radicals, which are identical or different, represent, independently of one another, a linear or branched monovalent alkyl group, a cycloalkyl group, a (cycloalkyl)alkyl group, the ring being substituted or unsubstituted and being able to comprise at least one heteroatom or one fluoroalkyl group, an aromatic group, an arylalkyl group, a fluoroalkyl group, an alkylamine group or an alkylguanidine group, and
the $R^1$, $R^2$, $R^3$ or $R^4$ radicals can be linked up in pairs so as to form a 3-, 4-, 5-, 6- or 7-membered aliphatic ring optionally substituted by one or more substituents.

These are pentasubstituted guanidines and exhibit the advantage of being liquid, colorless, odorless and soluble in silicone matrices.

According to a preferred embodiment, the following compounds (A7) to (A9) are preferred:

(A7)
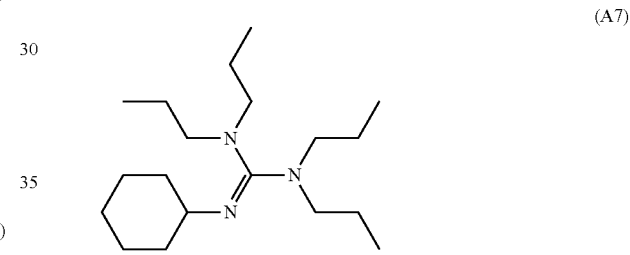

(A8)
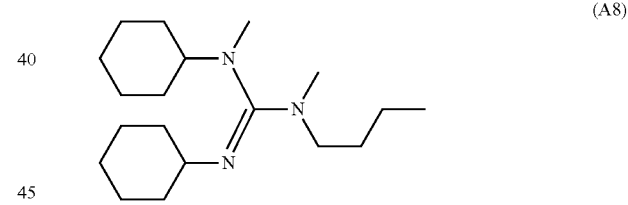

(A9)
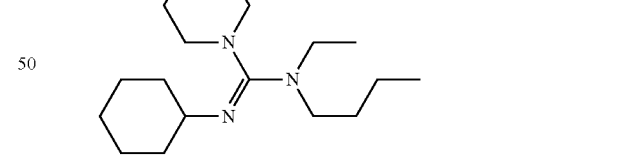

They are, for example, described in French patent application No. FR-0806610, filed on Nov. 25, 2008.

According to another embodiment, the condensation catalyst F is a metal complex or salt of zinc of formula:

$$[Zn(L^1)_{r1}(L^2)_{r2}] \quad \text{(III)}$$

in which:
$r1 \geq 1$ and $r2 \geq 0$ and $r1+r2=2$,
the symbol $L^1$ represents a ligand which is a β-dicarbonylato anion or the enolate anion of a β-dicarbonyl compound or an acetylacetato anion derived from a β-ketoester, and
the symbol $L^2$ represents an anionic ligand other than $L^1$.

Examples of catalysts of this type are described in the international application WO-2009/106723.

Preferably, the condensation catalyst F will be chosen from the following compounds:

(A10): Zn(DPM)$_2$ or [Zn(t-Bu-acac)$_2$] where DPM=(t-Bu-acac)=the 2,2,6,6-tetramethyl-3,5-heptanedionato anion or the enolate anion of 2,2,6,6-tetramethyl-3,5-heptanedione, (A11): [Zn(EAA)$_2$] with EAA=the ethyl acetoacetato anion or the enolate anion of ethyl acetoacetate, (A12): [Zn(iPr-AA)$_2$] with iPr-AA=the isopropyl acetoacetato anion or the enolate anion of isopropyl acetoacetate, and

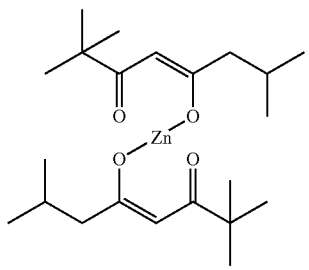

(A13)

This catalyst exhibits the advantage of being liquid at ambient temperature (25° C.) and of being soluble in organic solvents, even in alkanes, and in silicone oils.

According to a preferred embodiment, the polyorganosiloxane composition X according to the invention comprises:

A) per 100 parts by weight of at least one polyorganosiloxane A comprising at least one alkoxylated group and composed of identical or different siloxyl units, of formula:

$$(Z)_b(R^4)_a SiO_{[4-(a^+ +b)]/2} \quad (1)$$

in which:
the symbol Z=[—(OCH$_2$CH$_2$)$_c$—OR$^5$], with c=0 or 1,
a=0, 1, 2 or 3; b=0, 1, 2 or 3, a+b=0, 1, 2 or 3,
the symbol R$^4$ represents a monovalent C$_1$ to C$_{13}$ hydrocarbon radical,
the symbol R$^5$ represents a monovalent C$_1$ to C$_6$ hydrocarbon radical or an alkoxyalkyl radical optionally comprising an ester functional group, and
with the condition that, for at least one siloxyl unit, the index b≥1, so that the polyorganosiloxane A comprises at least one alkoxylated group Z, B) from 1 to 50 parts by weight of at least one siloxane D which is a condensate obtained by partial hydrolysis and condensation of a polyalkoxylated silane, said siloxane D having from 2 to 10 identical or different siloxyl units, of formula:

$$(R^2)_{x'}(OR^3)_{y'}SiO_{[4-(x'+y')]/2} \quad (2)$$

in which:
x'=0, 1, 2 or 3; y'=0, 1, 2 or 3; x'+y'=0, 1, 2 or 3,
the symbol R$^2$ represents a monovalent C$_1$ to C$_{13}$ hydrocarbon radical,
the symbol R$^3$ represents a monovalent C$_1$ to C$_6$ hydrocarbon radical or an alkoxyalkyl radical optionally comprising an ester functional group, and
with the condition that, for at least one siloxyl unit, the index y'≥1, C) from 0.1 to 50 parts by weight of an additive E capable of absorbing an oil used in a power train, such as acetylene black, D) from 0.01 to 50 parts by weight of a catalytically effective amount of at least one condensation catalyst F, E) from 0 to 250 parts by weight of at least one filler G, F) from 0 to 60 parts by weight of at least one adhesion promoter H, and G) from 0 to 20 parts by weight of at least one additive I, such as a coloring base, a pigment or a thixotropic agent.

Mention may be made, as an example of thixotropic agent, of:
inorganic thickeners, boric acid and borates, titanates, aluminates or zirconates;
compounds carrying hydroxyl groups;
compounds based on polyethylene and/or polypropylene;
compounds comprising cyclic amine functional groups;
compounds of polyether type or comprising polyether groups, and
fluororesins, preferably based on polyfluoroethylene (PFE) and more preferably still based on polytetrafluoroethylene (PTFE or Teflon®).

Another subject matter of the invention is an elastomer obtained by crosslinking, in the presence of water, of the polyorganosiloxane composition X according to the invention and as defined above.

Another subject matter of the invention is the use of the polyorganosiloxane composition X according to the invention and as defined above or of the elastomer according to the invention and as defined above to prepare silicone gaskets having good resistance to ageing in fluids used in a power train.

Finally, the last subject matter according to the invention is a process for sealing and assembly of at least one component of a power train, comprising the following stages a) to d):

a) a polyorganosiloxane composition X according to the invention and as defined above is prepared, b) said polyorganosiloxane composition X is applied to at least one contact region of said component, continuously or noncontinuously and optionally in the form of a strip, c) said polyorganosiloxane composition X is allowed to crosslink to form a silicone elastomer in the presence of moisture contributed by the ambient air or by prior addition of water, so as to form a gasket, and d) said component is assembled with another component of the power train so that the seal formed provides for the assembly and the sealing between the two components of the power train.

In the motor vehicle field, silicone elastomers are often used in the form of silicone seals. The term "silicone seals" encompasses several types of gaskets, namely "flowed" seals (FSs), also known as flattened seals, and profiled seals (PSs), also known as "shaped seals").

The "flowed" seals (FSs) are generally formed following the application of a pasty strip of the compositions to the region of contact between two metal or plastic constituents to be assembled. The pasty strip is first deposited on one of the constituents and then the other constituent is applied to the first; this results in flattening of the strip before it is converted into elastomer. Seals of this type are aimed at assemblages which do not have to be taken apart in common practice (oil sump seals, timing case seals, and the like).

The "profiled" seals (PSs) are used in particular in the transportation and motor vehicle sector for sealing applications with regard to all engine parts requiring the ability to be taken apart, such as, by way of examples, the cylinder-head cover, oil pump, water pump, radiator tank, oil sump, timing case or clutch guide. The "profiled seals" (PSs) are generally formed following the application of a pasty strip of the compositions to the region of contact between two constituents to be assembled. However, after the deposition of the pasty strip on one of the constituents, the strip is allowed to crosslink to form elastomer and then the second constituent is applied to the first. The result of this is that such an assemblage can be easily taken apart since the constituent which is applied to that which has received the seal does not adhere to this seal. Furthermore, the seal, by its elastomeric nature, matches the irregularities of the surfaces to have seals formed on them. For this reason, it is pointless to carefully machine the surfaces which have to be brought into contact with one another and to forcibly tighten the assemblages obtained. These distinguishing features make it possible, to a certain extent, to dispense with fastening seals, spacers or ribs usually intended to stiffen and reinforce the constituents of the assemblages. The "profiled seal" is generally a closed strip of silicone elastomer of ovoid cross section deposited according to a well-defined profile and which has to provide for the sealing of two (or more) parts which can be taken apart.

As the compositions used in the process according to the invention cure rapidly at ambient temperature and even in an enclosed environment, the result of this is that the silicone gaskets resulting from the curing of these compositions can be prepared under highly restrictive industrial manufacturing conditions. For example, they can be manufactured on the normal assembly lines of the motor vehicle industry equipped with an automatic device for the deposition of the compositions. This automatic device very often has a mixing head and a depositing nozzle, the latter moving along according to the outline of the seals to be manufactured. The compositions manufactured and distributed by means of this device preferably have a curing time which is properly adjusted in order, on the one hand, to avoid the compositions from setting solid in the mixing head and, on the other hand, to obtain complete crosslinking after the end of the deposition of the pasty strip on the parts on which seals are to be formed. These "sheet" seals are more especially suitable for cylinder head cover seals, gearbox case cover seals, timing spacer seals and even oil sump seals.

The component can be of diverse and varied nature and of glass, plastic, metal, and the like.

According to another specific embodiment of the process according to the invention, the component of the power train is chosen from the group consisting of: a cylinder head, an oil sump, a cylinder head cover, a timing case, a bearing bar, an engine cylinder block, a gearbox, a water pump, a positive crankcase ventilation box, a water filter, an oil filter, an oil pump, a housing comprising electronic components of a power train or a clutch housing.

Generally, the silicone composition is applied to the component either in the form of a continuous or noncontinuous seal or in the form of a continuous or noncontinuous layer. Use may be made of conventional deposition or coating techniques in order to form a continuous or noncontinuous layer.

After the deposition of the compositions as is on solid substrates, in a humid atmosphere, it is found that a process for curing to give elastomer takes place; it is carried out from the outside to the inside of the mass deposited. A skin is first formed at the surface and then the crosslinking is continued deep inside. The complete formation of the skin, which is reflected by a nontacky feel of the surface, requires a period of time of a few minutes; this period depending on the relative humidity of the atmosphere surrounding the compositions and on the ease of crosslinking of the compositions.

One-component bases are described in detail, for example, in patents EP 141 685, EP 147 323, EP 102 268, EP 21 859, FR 2 121 289 and FR 2 121 631, cited by way of reference.

Other advantages and characteristics of the present invention will become apparent on reading the following examples, given by way of illustration without any implied limitation.

I) PREPARATION OF THE FORMULATIONS

Commercial Products Used
Silanes (Comparative) and Partially Hydrolyzed and Condensed Silanes (According to the Invention):
  Dynasylan VTMO: $(CH_2=CH_2)Si(OCH_3)_3$ (supplier Evonik)
  Dynasylan MTMS: $CH_3Si(OCH_3)_3$ (supplier Evonik)
  Dynasylan A: $Si(OEt)_4$ (supplier Evonik)
  Dynasylan 40: partially hydrolyzed and condensed $Si(OEt)_4$
  Dynasylan 6490: partially hydrolyzed and condensed vinyltrimethoxysilane (VTMO).
Condensation Catalysts:
  Tyzor PITA SM: 20% by weight of $CH\ Si(OCH_3)_3$ and 80% by weight of $(iPrO)_2Ti(ethyl\ acetoacetonate)_2$
Adhesion Promoters:
  Dynasylan DAMO (Evonik): N-(beta-aminoethyl)-gamma-aminoproplytrimethoxysilane
  Dynasylan GLYMO (Evonik): gamma-glycidoxypropyltrimethoxysilane
Fillers:
  Celite 350: Diatomaceous earth (supplier World Minerals)
  Silica AE55: Surface-treated fumed silica
  Winnofil SPM: stearate-treated calcium carbonate (supplier Solvay)
  BLR3: calcium carbonate treated at the surface with a stearate (supplier Omya)
  Black Y70: acetylene black (supplier SN2A)
Products Prepared
  Synthesis of 1-butyl-2,3-dicyclohexylguanidine (2)

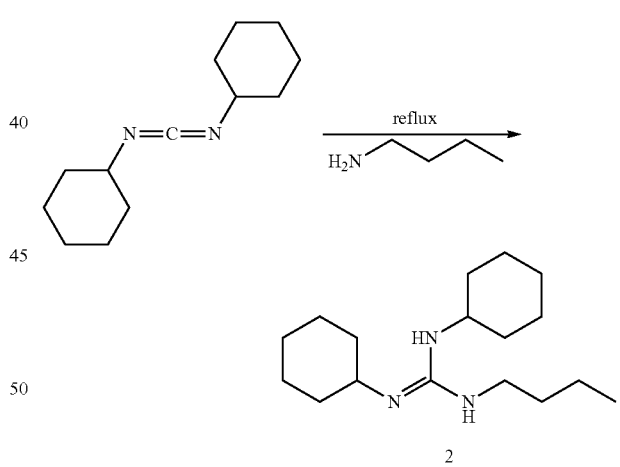

A mixture of 15.69 g of N-butylamine (0.214 mol) and 22.13 g of dicyclohexylcarbodiimide (0.107 mol) is heated at reflux for 2 h. GC analysis then shows a conversion of the dicyclohexylcarbodiimide of greater than 99.6%. The final colorless mixture is concentrated at 60° C. under 1 mbar for 2 h to give 29.7 g of a colorless, virtually odorless and moderately viscous liquid corresponding to the expected guanidine 2 (99% yield).

Comparative Example C1

895 g of α,ω-dihydroxylated polydimethylsiloxane oil, comprising 0.065% by weight of hydroxyl OH groups and 12 g of vinyltrimethoxysilane (VTMO, Evonik) are introduced into a mixer equipped with a stirrer of "butterfly" type. This mixture is homogenized by rotating the "butterfly" at 200 rev/min for two minutes. Subsequently, 4.8 g of a functionalization catalyst based on lithium hydroxide monohydrate dissolved in methanol are then added. A phase of homogenizing at 400 rev/min for 4 minutes follows. 108 g of treated fumed silica D4 are then incorporated at a stirring speed of 190 rev/min and are dispersed for an additional 4 minutes at 400 rev/min. 144 g of diatomaceous earth (Celite 350, World Minerals) are then incorporated at stirring speed of 200 rev/min and are dispersed for an additional 4 minutes at 400 rev/min. The medium is then subjected to a phase of degassing under a partial vacuum of 50 mbar and then the mixture is placed under nitrogen and stored with the exclusion of moisture. 24 g of Tyzor PITA SM catalyst are added under nitrogen and with stirring. The medium is stirred and then subjected to a phase of degassing under a partial vacuum of 40 mbar at 130 rev/min. Finally, the mixture is transferred into closed plastic cartridges.

Comparative Example C2

765 g of α,ω-dihydroxylated polydimethylsiloxane oil, comprising 0.065% by weight of hydroxyl OH groups, 95.5 g of Y70 acetylene black (SN2A) and 23.8 g of vinyltrimethoxysilane (VTMO, Evonik) are introduced into a mixer equipped with a stirrer of "butterfly" type. This mixture is homogenized by rotating the "butterfly" at 200 rev/min for two minutes. Subsequently, 0.58 g of a functionalization catalyst based on lithium hydroxide monohydrate dissolved in methanol is then added. A phase of homogenization for 4 minutes at 400 rev/min follows. 302 g of BLR3 calcium carbonate (Solvay) are then incorporated at a stirring speed of 200 rev/min and are dispersed for an additional 4 minutes at 400 rev/min. The medium is then subjected to a phase of degassing under a partial vacuum of 50 mbar and then the mixture is placed under nitrogen and stored with the exclusion of moisture.

15 g of Tyzor PITA SM are added under nitrogen and with stirring. The medium is stirred and then subjected to a phase of degassing under a partial vacuum of 40 mbar at 130 rev/min. Finally, the mixture is transferred into closed plastic cartridges.

Comparative Example C3

626 g of α,ω-dihydroxylated polydimethylsiloxane oil, comprising 0.045% by weight of hydroxyl OH groups, 120 g of α,ω-trimethylsilylated polydimethylsiloxane oil with a viscosity of 100 mPa·s, 96 g of Y70 acetylene black (SN2A) and 48 g of vinyltrimethoxysilane (VTMO, Evonik) are introduced into a mixer equipped with a stirrer of "butterfly" type. This mixture is homogenized by rotation of the "butterfly" at 200 rev/min for two minutes. Subsequently, 0.6 g of a functionalization catalyst based on lithium hydroxide monohydrate dissolved in methanol is then added. A phase of homogenization for 4 minutes at 400 rev/min follows. 300 g of BLR3 calcium carbonate (Solvay) are then incorporated at a stirring speed of 200 rev/min and are dispersed for an additional 4 minutes at 400 rev/min. The medium is then subjected to a phase of degassing under a partial vacuum of 50 mbar and then the mixture is placed under nitrogen and stored with the exclusion of moisture.

6 g of Dynasylan DAMO and 3.6 g of di(cyclohexyl)methylbutylguanidine (1) are added under nitrogen and with stirring. The medium is stirred and then subjected to a phase of degassing under a partial vacuum of 40 mbar at 130 rev/min. Finally, the mixture is transferred into closed plastic cartridges.

Comparative Example C4

The same example as that described in example C1 but 12 g of partially hydrolyzed methyltrimethoxysilane (1) are also added immediately before the introduction of the Tyzor PITA SM catalyst.

Comparative Example C5

The same example as that described in example C1 but 24 g of partially hydrolyzed methyltrimethoxysilane (1) are also added immediately before the introduction of the Tyzor PITA SM catalyst.

Example 5

Invention

The same example as C2 but 48 g of partially hydrolyzed and condensed methyltrimethoxysilane are also added immediately before the introduction of the Tyzor PITA SM catalyst.

Example 6

Invention 585 g of α,ω-dihydroxylated polydimethylsiloxane oil, comprising 0.045% by weight of hydroxyl OH groups, 120 g of α,ω-trimethylsilylated polydimethylsiloxane oil with a viscosity of 100 mPa·s, 96 g of Y70 acetylene black (SN2A) and 24 g of vinyltrimethoxysilane (VTMO, Evonik) are introduced into a mixer equipped with a stirrer of "butterfly" type. This mixture is homogenized by rotation of the "butterfly" at 200 rev/min for two minutes. Subsequently, 0.5 g of a functionalization catalyst based on lithium hydroxide monohydrate dissolved in methanol is then added. A phase of homogenization for 4 minutes at 400 rev/min follows. 300 g of BLR3 calcium carbonate (Solvay) are then incorporated at a stirring speed of 200 rev/min and are dispersed for an additional 4 minutes at 400 rev/min. The medium is then subjected to a phase of degassing under a partial vacuum of 50 mbar and then the mixture is placed under nitrogen and stored with the exclusion of moisture.

48 g of partially hydrolyzed methyltrimethoxysilane (1), 12 g of Dynasylan GLYMO and 15 g of Tyzor PITA SM catalyst are added under nitrogen and with stirring. The medium is stirred and then subjected to a phase of degassing under a partial vacuum of 40 mbar at 130 rev/min. Finally, the mixture is transferred into closed plastic cartridges.

Example 7

Invention

The same example as C3 with 24 g of vinyltrimethoxysilane instead of 48 g and addition of 48 g of Dynasylan 6490 immediately before the introduction of the 1-butyl-2,3-dicyclohexylguanidine (2) catalyst.

II) CHARACTERIZATION OF THE PRODUCTS

A) Mechanical Properties

A seal in the form of a film with a thickness of 2 mm is then prepared with each of the formulations and is allowed to crosslink for 7 days under controlled conditions (23° C.+/−2° C. and 50%+/−5% humidity). The Shore A hardness and the tensile mechanical properties (elongation at break, ultimate strength and modulus at 100% elongation) are then measured from test specimens with a thickness of 2 mm after crosslinking for 14 days.

b) Properties of Resistance to Engine Oils

Seals in the form of films with a thickness of 2 mm are crosslinked beforehand in a chamber conditioned at 23° C. and 50% relative humidity for 14 days. In each case, three square-shaped test specimens cut out from the seals, the Shore A hardness of which was measured beforehand (by superimposition of the three squares), are introduced into a 150 ml glass flask filled with 5W30 diesel oil (distributed by Total). After heating at 150° C. for three days and returning to ambient temperature, the test specimens are wiped using an absorbent paper and the Shore A hardness is measured using a Zwick hardness tester.

C) Adhesion Properties

A parallelepipedal seal of silicone elastomer with a thickness of 1 mm is applied between two test strips. The test specimen thus obtained, after crosslinking at 23° C.+/−2° C. and 50%+/−5% relative humidity for 14 days, is subjected to a tensile-shear stress. The adhesive bonding is characterized by the ultimate strength (MPa) and the type of failure (percentage of cohesive profile).

The aluminum test specimens of AG3 grade are scraped beforehand in order to remove the oxide layer, and are then cleaned with the solvent and dried.

For the tests of adhesion to a surface contaminated with oil, the test specimens are dipped in a mixture of heptane and Elf diesel oil 5W30 (95/5) for and are then drained before depositing the silicone elastomer seal.

III) RESULTS

TABLE 1

|  |  | C1 | C4 | C5 |
|---|---|---|---|---|
| Composition | Content of condensation catalyst (1) added (% by weight) | 0 | 1 | 2 |
| After crosslinking for 7 d at 23° C. and 50% RH | Shore A hardness (3 * 2 mm) | 36 | 42 | 46 |
|  | Ultimate strength (MPa) | 3.0 | 3.7 | 4.1 |
|  | Elongation at break (%) | 430 | 420 | 360 |
|  | Modulus at 100% | 1.0 | 1.2 | 1.5 |
| After treatment in Elf "Evolution" oil 5W30 | Shore A hardness (3 * 2 mm) | 2 | 7 | 15 |

TABLE 2

|  |  | Comparative examples | | Examples of the invention | | |
|---|---|---|---|---|---|---|
|  |  | C2 | C3 | 5 | 6 | 7 |
| Formulations | (1) in parts | 0 | 0 | 4 | 4 | 0 |
|  | DS6490 in parts | 0 | 0 | 0 | 0 | 4 |
|  | Adhesion promoter | 0 | DAMO | 0 | GLYMO | DAMO |
|  | Catalyst | Tyzor PITA SM | (2) | Tyzor PITA SM | Tyzor PITA SM | (2) |
| After crosslinking for 7 d at 23° C. and 50% RH | Shore A hardness (3 * 2 mm) | 8 | 33 | 50 | 38 | 43 |
|  | Ultimate strength (MPa) | 0.3 | 2.3 | 1.9 | 1.8 | 2.2 |
|  | Elongation at break (%) | 460 | 420 | 220 | 330 | 285 |
|  | Modulus at 100% | 0.15 | 0.71 | 1.14 | 0.86 | 1.16 |
| Breaking force (MLa) and cohesion (%) for adhesive bondings with a thickness of 1 mm | Aluminum AG3 | Not measured | 1.0 MPa (100% CF) | 0.9 MPa (95%) | 0.8 MPa (95%) | Not measured |
|  | Aluminum AG3 surface contaminated with oil | 0.1 MPa (0%) | 0.9 MPa (30%) | 0.5 MPa (5%) | 0.8 MPa (95%) | 1.0 MPa (85%) |
| After treatment in Elf "Evolution" oil 5W30 | Shore A hardness (3 * 2 mm) | <1 (not measurable) | 8 | 25 | 20 | 25 to 32 |

The invention claimed is:

1. A process for sealing and assembly of at least one component of a power train, comprising the following a) to d):
   a) preparing a polyorganosiloxane composition X,
   b) applying said polyorganosiloxane composition X to at least one contact region of said component, continuously or noncontinuously and optionally in a form of a strip,
   c) allowing said polyorganosiloxane composition X to crosslink to form a silicone elastomer in the presence of moisture contributed by ambient air or by prior addition of water, so as to form a gasket, and
   d) assembling said component with another component of the power train so that a seal formed provides for assembly and sealing between two components of the power train,
   wherein X comprises:
   A) at least one polyorganosiloxane A comprising at least one alkoxylated group and comprising identical or different siloxyl units, of formula:

$(Z)_b(R^4)_a SiO_{[4-(a+b)]/2}$ (1)

in which:
      the symbol $Z=[-(OCH2CH2)_c-OR5]$, with c=0 or 1, a=0, 1, 2 or 3; b=0, 1, 2 or 3, a+b=0, 1, 2 or 3,
      the symbol $R^4$ represents a monovalent $C_1$ to $C_{13}$ hydrocarbon radical,
      the symbol $R^5$ represents a monovalent $C_1$ to $C_6$ hydrocarbon radical or an alkoxyalkyl radical optionally comprising an ester functional group, and
      with the condition that, for at least one siloxyl unit, the index b≥1, so that the polyorganosiloxane A comprises at least one alkoxylated group Z,
   B) at least one siloxane D which is a condensate obtained by partial hydrolysis and condensation of a polyalkoxylated silane, said siloxane D having from 2 to 10 identical or different siloxyl units, of formula:

$(R^2)_{x'}(OR^3)_{y'}SiO_{[4-(x'+y')]/2}$ (2)

in which:
      x'=0, 1, 2 or 3; y'=0, 1, 2 or 3; x'+y'=0, 1, 2 or 3,
      the symbol $R^2$ represents a monovalent $C_1$ to $C_{13}$ hydrocarbon radical,
      the symbol $R^3$ represents a monovalent $C_1$ to $C_6$ hydrocarbon radical or an alkoxyalkyl radical optionally comprising an ester functional group, and
      with the condition that, for at least one siloxyl unit, the index y'≥1,
   C) an additive E capable of absorbing an oil used in a power train comprising acetylene black,
   D) a catalytically effective amount of at least one condensation catalyst F,
   E) optionally at least one filler G,
   F) optionally at least one adhesion promoter H, and
   G) optionally at least one additive I, optionally comprising a coloring base, a pigment or a thixotropic agent.

2. The process as claimed in claim 1, in which the crosslinkable polyorganosiloxane A is linear and comprises expanded formula:

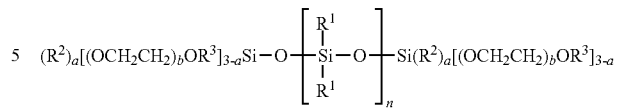

in which:
   the substituents $R^1$, which are identical or different, each represent a saturated or unsaturated monovalent $C_1$ to $C_{13}$ hydrocarbon radical which is substituted or unsubstituted and aliphatic, cyclanic or aromatic;
   the substituents $R^2$, which are identical or different, each represent a saturated or unsaturated monovalent $C_1$ to $C_{13}$ hydrocarbon radical which is substituted or unsubstituted and aliphatic, cyclanic or aromatic;
   the substituents $R^3$, which are identical or different, each represent a linear or branched $C_1$ to $C_6$ alkyl radical;
   n comprises a value sufficient to confer, on the polyorganopolysiloxane of formula A, a dynamic viscosity at 25° C. ranging from 1000 to 1 000 000 mPa·s; and
   the index a is equal to 0 or 1 and the index b is equal to 0 or 1.

3. The process as claimed in claim 1, in which the polyorganosiloxane A comprising at least one alkoxylated group is obtained by reacting, optionally in situ, in the presence of a catalytically effective amount of at least one functionalization catalyst C:
   a) at least one polyorganosiloxane A' comprising siloxyl units of formula:

$(R^1)_x(OH)_y SiO_{(4-x-y)/2}$ (4)

in which:
      x+y=0, 1, 2 or 3;
      the substituents $R^1$, which are identical or different, each represent a monovalent $C_1$ to $C_{30}$ hydrocarbon radical selected from the group consisting of alkyl, cycloalkyl, aryl, alkaryl and aralkyl radicals, and
      at least two siloxyl units comprising an ≡SiOH group are present in the polyorganosiloxane A', with
   b) at least one polyalkoxylated silane B of formula:

$(R^2)_z Si(OR^3)_{(4-z)}$ (5)

in which:
      z=0 or 1,
      the symbol $R^2$ represents a monovalent $C_1$ to $C_{13}$ hydrocarbon radical, and
      the symbols $R^3$, which are identical or different, each represent a monovalent $C_1$ to $C_6$ hydrocarbon radical or an alkoxyalkyl radical optionally exhibiting an ester functional group.

4. The process as claimed in claim 3, in which the functionalization catalyst C is lithium hydroxide or potassium hydroxide.

5. The process as claimed in claim 1, in which at least one filler G is present.

6. The process as claimed in claim 1, in which the condensation catalyst F is a tin, zinc or titanium derivative or an optionally silylated guanidine.

7. The process as claimed in claim 1, in which the condensation catalyst F is a guanidine corresponding to formula (I):

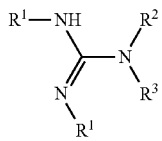

(I)

in which:
- the $R^1$ radicals, which are identical or different, represent, independently of one another, a linear or branched monovalent alkyl group, a cycloalkyl group, a (cycloalkyl)alkyl group, the ring being substituted or unsubstituted and being able to comprise at least one heteroatom, or a fluoroalkyl group,
- the $R^2$ radical represents a hydrogen atom, a linear or branched monovalent alkyl group, a cycloalkyl group, an alkyl group substituted by a ring, which is substituted or unsubstituted and which can comprise at least one heteroatom, an aromatic group, an arylalkyl group, a fluoroalkyl group, an alkylamine group or an alkylguanidine group,
- the $R^3$ radical represents a linear or branched monovalent alkyl group, a cycloalkyl group, an alkyl group substituted by a ring, which is substituted or unsubstituted and which can comprise at least one heteroatom, or an arylalkyl, fluoroalkyl, alkylamine or alkylguanidine group, and
- when the $R^2$ radical is not a hydrogen atom, the $R^2$ and $R^3$ radicals can be linked up to form a 3-, 4-, 5-, 6- or 7-membered aliphatic ring optionally substituted by one or more substituents.

8. The process as claimed in claim 1, in which the condensation catalyst F is a guanidine of formula:

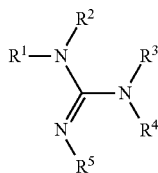

(II)

in which:
- the $R^1$, $R^2$, $R^3$, $R^4$ or $R^5$ radicals, which are identical or different, represent, independently of one another, a linear or branched monovalent alkyl group, a cycloalkyl group, a (cycloalkyl)alkyl group, the ring being substituted or unsubstituted and being able to comprise at least one heteroatom or one fluoroalkyl group, an aromatic group, an arylalkyl group, a fluoroalkyl group, an alkylamine group or an alkylguanidine group, and
- the $R^1$, $R^2$, $R^3$ or $R^4$ radicals can be linked up in pairs so as to form a 3-, 4-, 5-, 6- or 7-membered aliphatic ring optionally substituted by one or more substituents.

9. The process as claimed in claim 1, in which the condensation catalyst F is a metal complex or salt of zinc of formula:

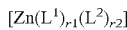

(III)

in which:
- $r1 \geq 1$ and $r2 \geq 0$ and $r1+r2=2$,
- the symbol $L^1$ represents a ligand which is a β-dicarbonylato anion or the enolate anion of a β-dicarbonyl compound or an acetylacetato anion derived from a β-ketoester, and
- the symbol $L^2$ represents an anionic ligand other than $L^1$.

10. The process as claimed in claim 1, wherein X comprises:
A) per 100 parts by weight of at least one polyorganosiloxane A comprising at least one alkoxylated group and composed of identical or different siloxyl units, of formula:

   (1)

in which:
- the symbol $Z=[-(OCH_2CH_2)_c-OR^5]$, with $c=0$ or 1, $a=0, 1, 2$ or $3$; $b=0, 1, 2$ or $3$, $a+b=0, 1, 2$ or $3$,
- the symbol $R^4$ represents a monovalent $C_1$ to $C_{13}$ hydrocarbon radical,
- the symbol $R^5$ represents a monovalent $C_1$ to $C_6$ hydrocarbon radical or an alkoxyalkyl radical optionally comprising an ester functional group, and
- with the condition that, for at least one siloxyl unit, the index $b \geq 1$, so that the polyorganosiloxane A comprises at least one alkoxylated group Z, B) from 1 to 50 parts by weight of at least one siloxane D which is a condensate obtained by partial hydrolysis and condensation of a polyalkoxylated silane, said siloxane D having from 2 to 10 identical or different siloxyl units, of formula:

   (2)

in which:
- $x'=0, 1, 2$ or $3$; $y'=0, 1, 2$ or $3$; $x'+y'=0, 1, 2$ or $3$,
- the symbol $R^2$ represents a monovalent $C_1$ to $C_{13}$ hydrocarbon radical,
- the symbol $R^3$ represents a monovalent $C_1$ to $C_6$ hydrocarbon radical or an alkoxyalkyl radical optionally comprising an ester functional group, and
- with the condition that, for at least one siloxyl unit, the index $y' \geq 1$, C) from 0.1 to 50 parts by weight of an additive E capable of absorbing an oil used in a power train comprising acetylene black,
D) from 0.01 to 50 parts by weight of a catalytically effective amount of at least one condensation catalyst F,
E) from 0 to 250 parts by weight of at least one filler G,
F) from 0 to 60 parts by weight of at least one adhesion promoter H, and
G) from 0 to 20 parts by weight of at least one additive I, optionally comprising a coloring base, a pigment or a thixotropic agent.

11. The process as claimed in claim 1, in which at least one filler G is present and comprises a calcium carbonate treated at a surface thereof with a stearic acid.

12. A silicone gasket having resistance to ageing in fluid used in a power train prepared by a process as claimed in claim 1.

13. The process as claimed in claim 1, in which at least one adhesion promoter H is present.

14. The process as claimed in claim 1, in which at least one additive I is present and comprises a coloring base, a pigment or a thixotropic agent.

15. A power train prepared by a process as claimed in claim 1.

* * * * *